Sept. 4, 1934.   G. K. ANDERSON   1,972,255
TREATING AND DECANTING KETTLE
Filed Oct. 19, 1932
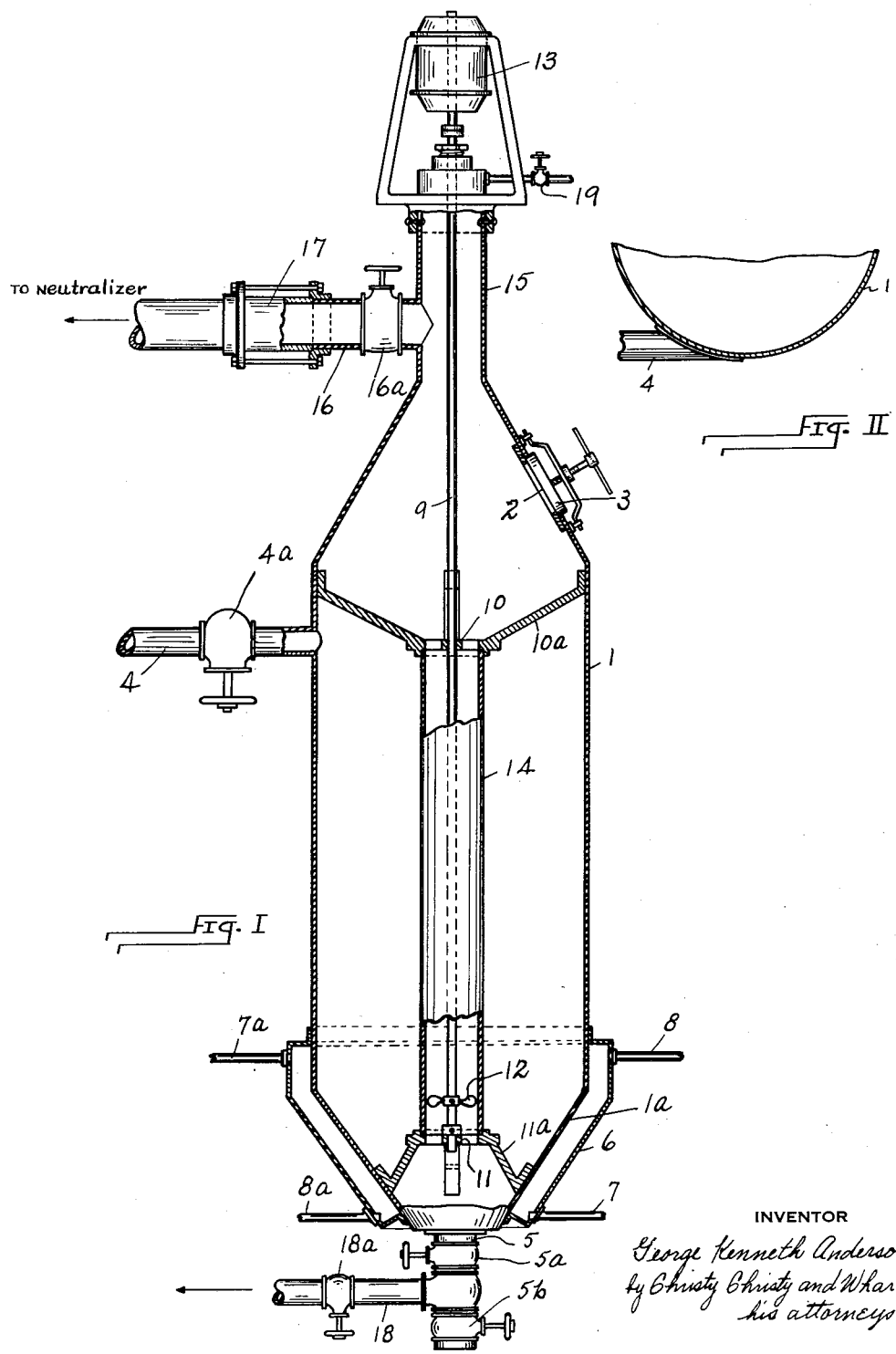
INVENTOR
George Kenneth Anderson
by Christy Christy and Wharton
his attorneys Patented Sept. 4, 1934

1,972,255

UNITED STATES PATENT OFFICE 1,972,255

TREATING AND DECANTING KETTLE

George Kenneth Anderson, Pittsburgh, Pa., assignor to The Neville Company, a corporation of Pennsylvania Application October 19, 1932, Serial No. 638,583

4 Claims. (Cl. 210—58)

This invention relates to the decantation of resinous polymers.

An object of the invention is to provide a washing kettle of such structure that a blend containing the more soluble polymers may be decanted therefrom by flotation in such manner as to obtain an accurate separation of the blend from sludges of every character which have been formed during the polymerizing reaction.

Another object of the invention is to provide a washing vessel, which is jacketed, and has such fluid connections to its jacket, and to the interior of the vessel, that the interior walls of the vessel may be kept free from sludge adhesion, and the lighter sludges may be drawn off separately from both the heavy sludges and the blend containing the most desired, and more soluble polymers.

A still further object of the invention is to provide a method of decantation whereby the lighter and more soluble products of polymerization may be recovered free from contamination by either heavy or light sludges, and whereby the lighter sludges may be recovered independently of the heavy sludges.

In the drawing, Figure I shows in vertical section a kettle embodying the structural features of my invention, and examplary of apparatus for conducting my method, and Figure II is a fragmentary cross-section illustrating a modification in the positioning of the connection for introducing decanting fluid into the kettle.

In the drawing reference numeral 1 designates the body of my washing kettle. The body of the kettle is provided with a manhole 2, having a cover 3 therefor, an inlet 4, having a valve 4a therein, and a drain pipe 5, provided with a valve 5a. The lower portion 1a of the kettle body is in the form of an inverted cone terminating at drain pipe 5, and has a jacket 6 disposed exteriorly thereof. Jacket 6 is provided with a water inlet pipe 7, water outlet pipe 7a and steam inlet and outlet 8 and 8a respectively.

The agitating means for the kettle comprise a shaft 9 mounted in an open upper bearing 10, supported by a spider 10a, and in an open lower bearing 11 mounted in a spider 11a. Shaft 9 carries a propeller 12, and is revolved by a motor 13 mounted above the body 1 of the kettle.

Carried by spiders 10a and 11a, is a standpipe 14, which is of relatively great diameter, and which contains the propeller 12.

My kettle is particularly adapted to the washing and separation of resinous polymers in a blend comprising a substantial quantity of diluent added either before or after polymerization. I am concerned chiefly with the polymerization of crude solvent naphtha, or its substantial equivalent, in the manufacture of polymerized products of the coumarone-indene series, and shall therefore describe the use of my kettle specifically as used in such a process. It has become well known that the production of resins of the coumarone-indene series by polymerization of constituents of crude solvent naphtha, or its substantial equivalent, is best performed in the presence of considerable volume of solvent diluent, such as refined naphtha or a petroleum distillate. Of these hydrocarbon diluents I find petroleum distillate the more satisfactory at least in so far as the use of my washing kettle is concerned.

The process of polymerization may be effected in the kettle described herein, or may be effected in another kettle. In either instance the liquid containing the resin-forming bodies is subjected to the effect of a suitable polymerizing agent, such, for example, as sulphuric acid or aluminum chloride. Polymerization is effected with agitation of the liquid containing the resin-forming bodies by agitating means, such for example as the shaft 9 and propeller 12.

Either before, during, or after polymerization, preferably before polymerization, a relatively great quantity of diluent is added to form a blend. If the polymerization has been effected exteriorly to the kettle in which the washing and decantation are to be performed, the blend may be run into the washing kettle by way of manhole 2.

It will be noted that the portion 1b of the kettle, which lies upwardly of inlet 4, is of constricted form, being shown as a cone terminating in a column 15. While the conical form of the upper kettle region is convenient, it should be understood that my desired effect may be obtained by any kettle form which provides an upwardly increasing constriction in this region of the kettle, terminating in a column of relatively small cross-sectional area.

From column 15 there leads a decanting nipple 16 provided with a valve 16a. Decanting nipple 16 leads to apparatus for recovering the coumarone resin, or other products of polymerization, and desirably leads to a neutralizer in which the blend drawn off from the kettle is washed free of the polymerizing agent. Decanting nipple 16 comprises a sleeve 17 of glass, or other transparent material, through which liquid passing to the recovery apparatus may be observed.

At a point below the valve 5a therein, a branch pipe 18 having therein a valve 18a leads to recovery apparatus or storage. Below the point where branch pipe 18 connects therewith, drain pipe 5 is provided with a second valve 5b.

After a polymerizing treatment in the kettle, or the introduction of a polymerized blend into the kettle, valve 5a in drain pipe 5 is opened, and the heavy sludge and spent acid are drawn off. After closing valve 5a, hot water, desirably at a temperature of about 80 degrees centigrade, and in a volume equal to from 3% to 5% the volume of the polymerized blend, is then run into the kettle. This relatively small volume of hot water is agitated with the polymerized blend until the red color initially present, showing the presence of some acid, disappears.

To effect decantation, valve 16a in decanting nipple 16 is opened, and hot water is run into the kettle by way of inlet pipe 4. The water used is hot in order to prevent the formation of a white pasty emulsion, caused by separation of a small quantity of resin from solution, which would occur if cold water were used. A suitable temperature for the water is from 5 degrees centigrade to 10 degrees centigrade above the highest temperature of the reaction by which the resinous polymers were formed. The manhole cover 3 is applied before the liquid in the kettle reaches such level that it may escape through manhole 2. As water is progressively added to the kettle, the blend is floated into, and through, the decanting nipple 16. It should be understood that a stratification occurs by flotation, both the blend containing the desired polymers, and the light sludges, being floated by the hot water flowed into the polymerizing kettle. Of these the polymerized blend is uppermost; with the light sludges on and adjacent the surface of the water, and beneath the blend containing the desired polymers.

During the outflow of blend through decanting nipple 16, the character of the liquid passing through the nipple is observed by the operator at transparent sleeve 17. When the passage of the lighter sludges, which will not have been dissolved in the diluent, is observed the operator shuts off valve 16a, and valve 4a, thus terminating the initial decanting operation.

In order to trap the light sludges, a vent 19 is opened to the atmosphere, and the decanting water is drawn off through drain pipe 5. The drawing off is continued until the light sludge, which is still floating on the water, may be observed issuing from the drain pipe. Valve 5a, is then closed, and live steam is introduced, as by way of manhole 2, to clear the kettle wall of the adhering light sludge, and to run this sludge into the lower conical portion 1a of the kettle. This conical region of the kettle is simultaneously heated by passing steam through the jacket 6.

A suitable solvent naphtha of high solvent strength, for example either one of the grades known as No. 1 or No. 3 solvent stock, is then introduced, desirably in a volume approximately three times the volume of the light sludge. If the sleeve 14 surrounding propeller shaft 9 be used, water is desirably added to a level above the upper edge of the sleeve in order to assist the lifting action of the propeller.

After introduction of the solvent, it is agitated with the sludge, with the addition of sufficient soda to render the mix alkaline, and the sludge and solvent as a mixture, or partial solution, may be drawn off by pipe 18, controlled by valve 18a to a suitable heated collection, settling and storage tank. When a sufficient volume and concentration of the mixture, or solution, has been collected, it may be distilled for the recovery of these light sludges, which are dark resins suitable for certain uses. Desirably the same body of naphtha is reused several times until its resinous content has been built up to a concentration justifying distillation.

The decantation described results in obtaining an initial, or preferred, cut of blend which is not only wholly free of heavy sludges, but which is also substantially free of the lighter sludges; that is, substantially free of the darker resins. This nice separation may be effected for the reason that the light sludges are but sparingly soluble in refined naphtha, if that be used as a diluent, under the conditions of the polymerizing treatment. They may, for all practical purposes, be considered wholly insoluble in a petroleum distillate diluent, under the conditions of the polymerizing treatment. The most desirable, light resin, polymers are soluble in either diluent.

By making use of the degrees of solubility, and gravity, of the various grades of polymers produced in a decanting method, following a polymerizing treatment, I am able to recover the light resins free from dark resin contamination, and am able to recover the dark resins separately, as a valuable product.

I claim as my invention:

1. A decanting kettle for the separation of mixed liquids of viscous nature comprising a body having an upwardly constricted upper region a downwardly constricted lower region and an intermediate region, a controlled supply port in the kettle, a valved water connection to the kettle below the constricted upper region thereof, a decanting nipple leading from a highly constricted portion of the upper kettle region, means for exhibiting liquid passing into the decanting nipple, mechanical agitating means in the kettle, a steam jacket localized in position to the lower kettle region, a valved drainage nipple at the bottom of the kettle, and a valved discharge line from the kettle.

2. A reaction and decanting kettle for the treatment and separation of mixed liquids of viscous nature comprising a body having an upwardly constricted upper region a downwardly constricted lower region and an intermediate region, a controlled supply port in the kettle, a valved water connection to the kettle below the upper constricted region thereof, a decanting nipple leading from a highly constricted portion of the upper kettle region, means for exhibiting liquid passing into the decanting nipple, mechanical agitating means in the kettle, a jacket on the kettle body and having both steam and water connection thereto, and a valved drainage nipple at the bottom of the kettle.

3. A decanting kettle for the separation of mixed liquids of viscous nature comprising a body having an upwardly constricted upper region a downwardly constricted lower region and an intermediate region, a controlled supply port in the kettle, a valved water connection to the kettle below the constricted upper region thereof arranged tangentially of the kettle wall, a decanting nipple leading from a highly constricted portion of the upper kettle region, means for exhibiting liquid passing into the decanting nipple, mechanical agitating means in the kettle, a steam jacket localized in position to the lower kettle region, a valved drainage nipple at the bottom of the kettle, and a valved discharge line from the kettle.

4. A reaction and decanting kettle for the treatment and separation of mixed liquids of viscous nature comprising a body having an upwardly constricted upper region a downwardly constricted lower region and an intermediate region, a controlled supply port in the kettle, a valved water connection to the kettle below the upper constricted region thereof arranged tangentially of the kettle wall, a decanting nipple leading from a highly constricted portion of the upper kettle region, means for exhibiting liquid passing into the decanting nipple, mechanical agitating means in the kettle, a jacket on the kettle body and having both steam and water connection thereto, and a valved drainage nipple at the bottom of the kettle.

GEORGE KENNETH ANDERSON.